(12) United States Patent
Brown et al.

(10) Patent No.: US 6,665,342 B1
(45) Date of Patent: Dec. 16, 2003

(54) SYSTEM AND METHOD FOR PRODUCING A STILL IMAGE REPRESENTATION OF A MOTION VIDEO (75) Inventors: Lisa Marie Brown, Pleasantville, NY (US); Susan Crayne, Hartsdale, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/345,024

(22) Filed: Jul. 2, 1999

(51) Int. Cl.[7] ................................................. H04B 1/66
(52) U.S. Cl. ................................................. 375/240.16
(58) Field of Search ........................... 348/420.1, 413.1, 348/169, 579, 586, 587, 699, 700; 375/240.16; 382/236, 173, 194, 283

(56) References Cited

U.S. PATENT DOCUMENTS

| | | | | |
|---|---|---|---|---|
| 6,014,181 A | * | 1/2000 | Sun | 348/699 |
| 6,553,069 B1 | * | 4/2003 | Shin et al. | 375/240.14 |
| 6,603,509 B1 | * | 8/2003 | Haruki | 348/231.1 |

OTHER PUBLICATIONS

Claudette Cedras and Mubarak Shah, Motion-based recognition, image and vision, vol. 13, 2–28.*
C. Cedras, et al., "Motion-based recognition: a survey," Image and Vision Computing, vol. 13, No. 2, Mar. 1995, 27 pages.

* cited by examiner

Primary Examiner—Vu Le
Assistant Examiner—Behrooz Senfi
(74) Attorney, Agent, or Firm—Louis J. Percello (57) ABSTRACT A still image from a digital video sequence by a computer system executing a strobe process. After an initialization step, the strobe process interatively selects two of the still frames in a sampled order. An attribute differencing step is performed that determines the difference of the attribute of the selected frames using a frame to frame comparison (attribute difference) and determines if the attribute difference from one frame to the other frame exceeds an attribute sensitivity. The attribute difference is stored along with the motion statistics of the attribute difference and if the attribute difference meets certain conditions, a relevant motion is determined. If a relevant motion is determined, a segmentation mask at one or more mask locations corresponding to the frame locations is updated. A strobe photo is also updated with the relevant motion at one or more photo locations corresponding to the mask and frame locations so that a history of relevant motions is recorded on the strobe photo.

10 Claims, 6 Drawing Sheets

SYSTEM AND METHOD FOR PRODUCING A STILL IMAGE REPRESENTATION OF A MOTION VIDEO

FIELD OF THE INVENTION

This invention relates to the field of digital video and/or image processing. More specifically, the invention relates to producing one or more still image representations of a motion video.

BACKGROUND OF THE INVENTION

A still image representation of a simple motion video provides a visual record of an objects' motion. Depending on the specification of a timing parameter, the still image depicts the displacements of the object or objects over time. This image representation of the motion inherent in the video sequence can be used to visually inspect, measure, and analyze the event.

Using physical devices, conventional film photographers have been able to create imagery of moving objects using several techniques. For slow movement, including time-lapse, photographs are created by automatically opening the shutter using a timer and, if the action is to be recorded on a single photograph, exposing the film multiple times. For outdoor images which may have variable lighting, a powerful strobe light may also be used to conceal the natural variation in the lighting. In high-speed photography, either a very fast shutter and/or short brilliant flashes of light from a strobe lamp are used in order to capture the action while providing adequate light. Various mechanical and electronic devices are used to record the action on film, such as rotating mirrors and prisms, rotating shutters with various slits, film spools, and timers for synchronizing flashes and shutters. In general, to shoot a conventional film photograph showing the movement of objects over time, requires specific equipment such as strobe lights, timers, and automatic shutters, and needs to be done at the scene of the action of interest.

In the field of digital video, procedures for mixing and performing luminance and chroma (chromatic) keying are used to overlay text or graphics, fade from one sequence into another, and combine the foreground of one scene with the background of another. In particular, keying, is used to substitute the background signal in portions of the foreground signal based on some attribute of the video signal. In chroma keying, also referred to as blue-screen, an easily segmented background (often this is blue, hence the term "blue-screen") is used so that the action in the foreground can be extracted by a simple thresholding of the chrominance value at each point and overlaid on a different background.

In digital background subtraction, more sophisticated techniques are used to segment out the background. Three main approaches are taken. In the first class of methods, statistical texture properties of the background are observed over an extended period of time. This requires additional footage and preprocessing. The second class of methods is based upon geometry and relies on the assumption that the geometry of the background remains stationary over time. For these methods, specific hardware configurations such as stereo or multiple cameras are necessary. The third class of the methods, of which this process is most closely related, is based upon presuming that the background is stationary or at most slowing changing. These methods are often devised as preliminary steps to representing and recognizing actions of a specific nature, such as human gestures or facial expressions or tracking an object over time. Some of the prior art is included in, e.g., "Motion-based recognition: A survey. Image and Vision Computing", by Cedras, C., and Shah, M."Image and Vision Computing" 13(2):129–155, March '95, which is herein incorporated by reference in its entirety. These methods create either representations of specific motions in the case of motion recognition, or trajectories of objects in the case of visual tracking. The motion representations include three dimensional models, sequences of features or properties, or characteristics of temporal and spatial changes. Since recognition requires a noisy and large search space, these methods are designed to create representations which are easily indexed, compact, and invariant to small variations. For visual tracking, correspondence is necessary, either at the image level, to perform optic flow, region segmentation and matching, or at the feature level, to match features over time. In general, this is a much more complex task involving image preprocessing for segmentation or feature detection, geometric and temporal constraints to limit search, and matching techniques, such as image correlation or warping.

PROBLEMS WITH THE PRIOR ART

Some prior art requires strobe lights, timers, automatic shutters, and other analog equipment. It is also necessary to acquire the photographs at the scene, during the event, and can only be done with a single setting of parameters. Strobe lights are triggered at fixed time intervals and shutter speeds are similarly set to specific speeds. Once photographs are acquired, the only way to alter these settings is to recapture a similar event with a new set of parameters.

Some prior art can only be used with a fixed physical background such as a uniformly lit blue screen. With these simple digital techniques, the background needs to be trivially segmented, i.e., above or below a luminance or chromatic threshold.

Some prior art was developed for the purposes of recognizing specific actions or visually tracking the motion of objects. Statistical methods require preprocessing of footage containing only background information. Geometric methods require two or more cameras and/or perform a computationally costly and inherently noisy correspondence mapping. For motion recognition or tracking methods which assume a stationary background, these techniques generally perform some form of correspondence; they are developed to perform higher level functions and as a consequence these methods do not create a general visual representation for inspecting and measuring motion, and do not directly address or exploit the properties of the background/foreground segmentation with regard to creating a visual depiction of the motion history.

OBJECTS OF THE INVENTION

An object of this invention is an improved system and method for visualizing motion in video.

An object of this invention is an improved system and method for inspecting, analyzing and measuring motion in video.

SUMMARY OF THE INVENTION

This invention is a system and method for updating a strobe photo with one or more relevant motions at one or more photo locations in the strobe photo. The system is a computer system that stores and/or processes one or more well known digital video streams. (The stream has a plurality of still frames in a sequence called an ordered sequence.) A strobe process, executed by the system first initializes a motion history record with one or more motion statistics, a segmentation mask, an attribute, and an attribute sensitivity. Two of the still frames are iteratively selected in a sampled order. An attribute differencing step is performed that determines the difference of the attribute of the selected frames using a frame to frame comparison to determine an attribute difference at one or more frame locations in the frames and that further determines if the attribute difference from one frame to the other frame exceeds the attribute sensitivity. The attribute difference is then stored in the motion history record along with the motion statistics of the attribute difference. If the attribute difference exceeds the attribute sensitivity when the segmentation mask has not yet been updated, a relevant motion is determined. If the segmentation mask has been updated and the attribute difference exceeds one or more of the motion statistics within a statistical confidence level, a relevant motion is also determined. If these conditions are met (to determine a relevant motion), the segmentation mask, at one or more mask locations corresponding to the frame locations, is updated. If the segmentation mask is updated, a strobe photo is also updated with the relevant motion at one or more photo locations corresponding to the mask and frame locations so that a history of relevant motions is recorded on the strobe photo. The steps after initialization are repeated for each pair of frames selected as the stream is processed.

BRIEF DESCRIPTION OF THE FIGURES

The foregoing and other objects, aspects, and advantages will be better understood from the following non limiting detailed description of preferred embodiments of the invention with reference to the drawings that include the following.

DETAILED DESCRIPTION OF THE INVENTION

The present invention creates a still image from a digital video sequence. In one preferred embodiment, the sequence is assumed to have been taken from a single viewpoint, i.e., the camera was in a fixed position, or the sequence has been pre-filtered to correct for camera motion. The still image of video sequence shows the motion of one or more objects over time, traveling across the image plane. The background is assumed to be stationary, or at most, slowly changing. The still image created from the sequence depends on a timing parameter specified by the user. The image, called a digital strobe photograph (strobe photo), shows the object at each position in space, at each time interval overlaid on top of each other (a history of relevant motions). For example, a person diving off a cliff, is portrayed in a single image jumping from the cliff, diving halfway down the cliff, and diving into the water.

Figure 1:
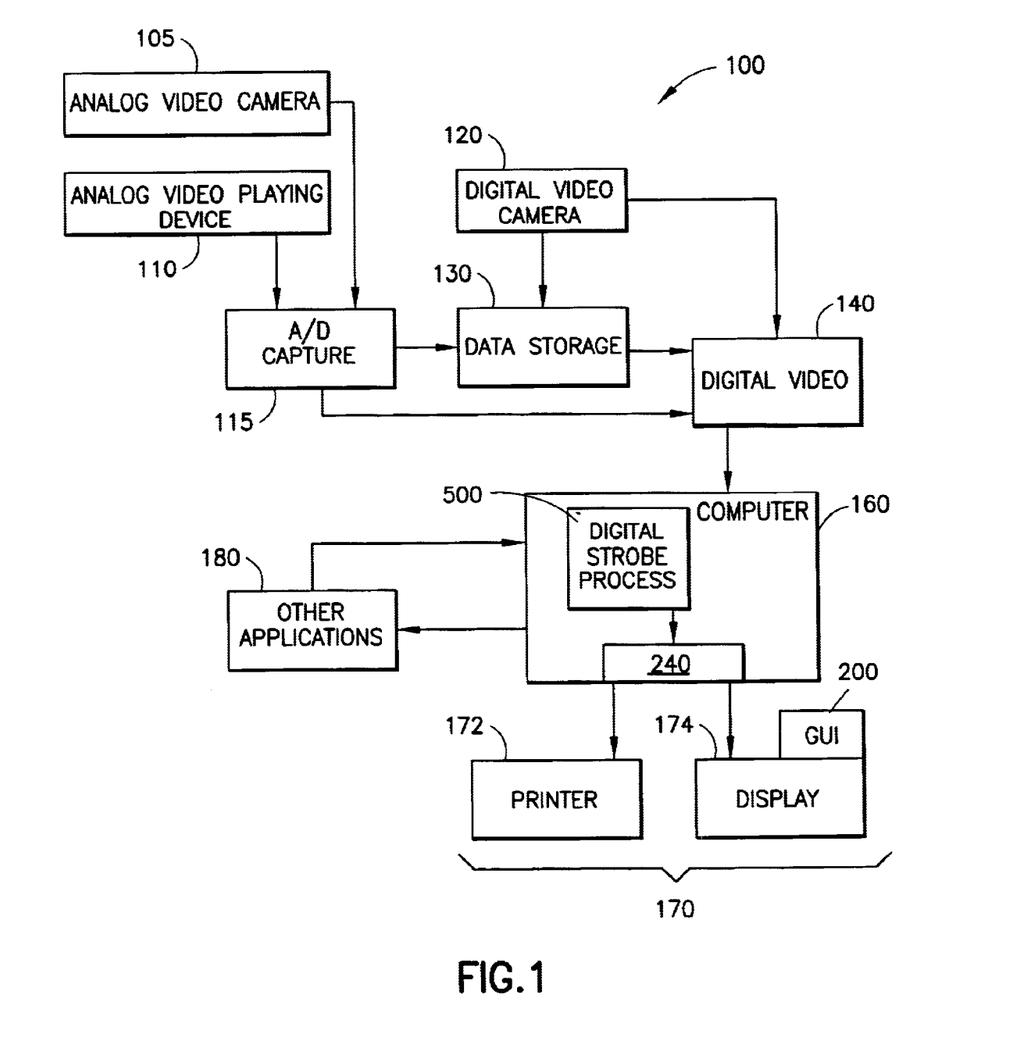
FIG. 1 is a block diagram of one embodiment of the present invention.

FIG. 1 is a block diagram of one preferred hardware embodiment of the present system 100. Video content enters the system in any number of well known ways including an analog video camera 105, a analog video playing device 110, resident images in storage 130, or a digital video camera 120. If the video enters in analog form it must be converted 115 prior to applying the strobe process. These devices and conversions are well known. The digital video is stored 130 into a digital video format 140 which is processed by the digital strobe process 500. This novel process produces an output that is a single image composite of more than one frame from a digital video input 140. The output can be displayed on any well known output device 170 that is connected to the system 100 through an appropriate interface 240. Example outputs include printers 172 and graphical user interfaces (GUIs) 174 and other applications 180. Other applications 180 may include various types of measurement software for educational or scientific investigations.

In one preferred embodiment, the digital video camera 120 is a high speed color digital video Redlake MotionScope but any ordinary less expensive digital video camera would also work. Another example is the Hitachi MPEG digital video camera MP-EG1A.

In a preferred embodiment, the input digital video 140 is assumed to have been taken from a single viewpoint, i.e., the camera was in a fixed position, or the sequence has been pre-filtered to correct for camera motion. The video sequence shows the motion of an object over time, traveling across the image plane. In a preferred embodiment, the background is assumed to be stationary, or at most, slowly changing.

The still image created from the sequence is called a digital strobe photograph (or strobe photo) 240. It 240 depicts the object at each position in space, at each time interval overlaid on the single output image. This image can be used in other applications 180 to take measurements such as location, distance traveled, speed of movement, magnitude and/or direction of increase/decrease/growth, and angle or height. These measurements could be used by the application to study scientific phenomena such as the mechanics of rigid bodies, e.g. a ball falling, the trajectory of celestial objects, or to analyze the motion in a sports activity such as golf or gymnastics.

Figure 2:
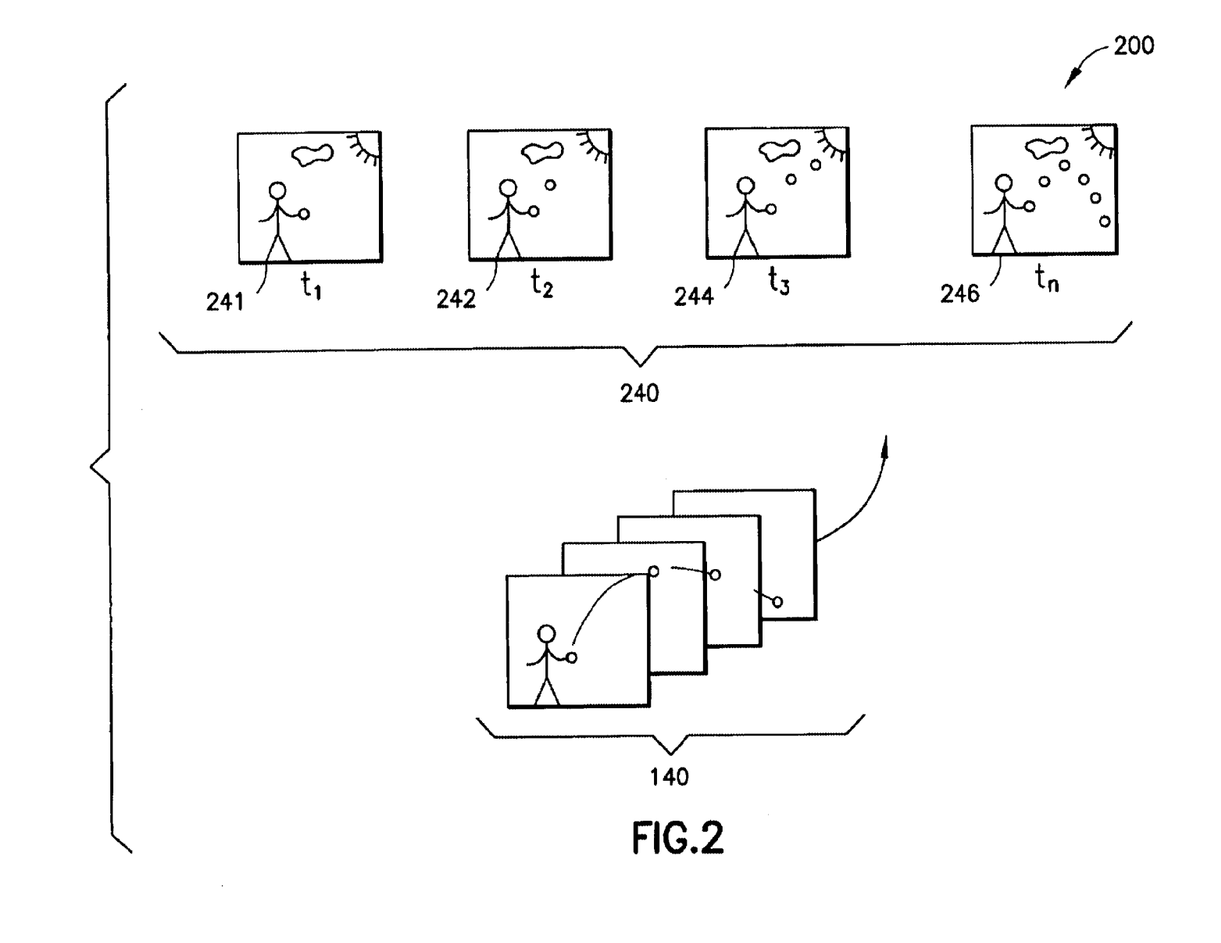
FIG. 2 is a sequence of drawings of screen images, over time, from a video to a still frame.

FIG. 2 is a sequence of drawings of screen images, over time, from a video 140 to an incrementally updated still frame 240 which is ultimately the strobe photo. At each time step, the still frame is updated, starting after the first time increment, $t_1$ 241 and continuing through $t_2$ 242, $t_3$ 244, etc., up until $t_n$ 246 where n is the number of time intervals sampled. The viewer sees the motion in the video sequences incrementally updated until a single image showing the entire encapsulated event is created. The event takes place from the start frame until the end frame and the encapsulated or summarized event is the visual depiction of the movement that took place. The movement shown, is the so called, relevant motion: the object (or objects) are shown in their initial location(s) and at each new location over time incremented by the specified time interval.

Figure 3:
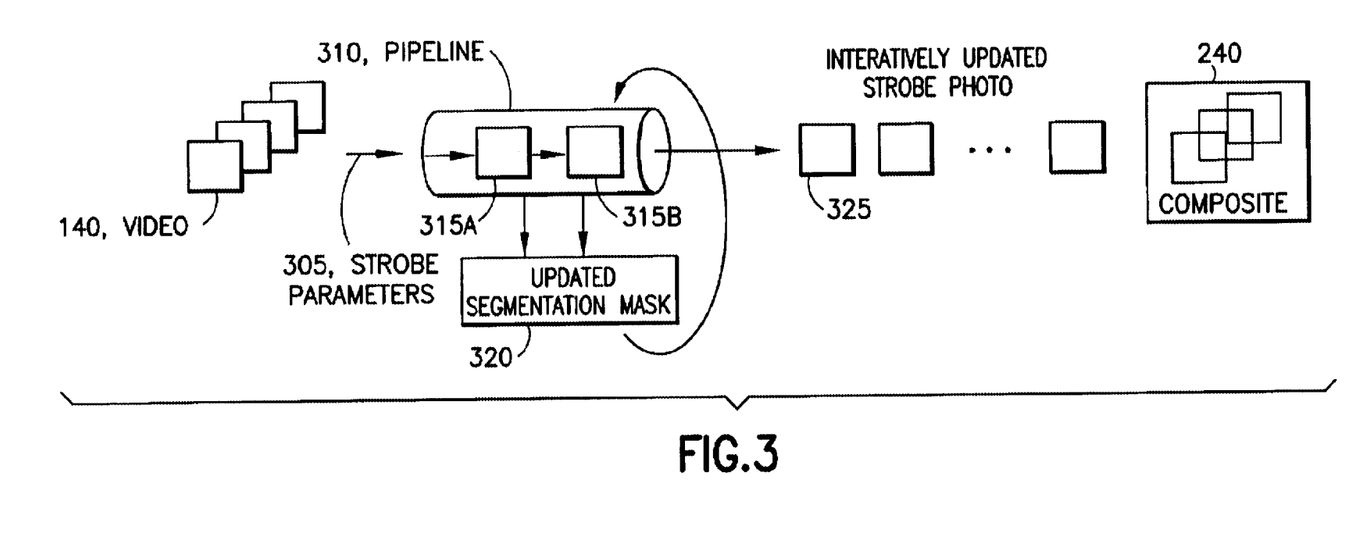
FIG. 3 is a block diagram of a data flow used to produce the screen images of FIG. 2.

FIG. 3 is a block diagram of the data flow used to produce the screen images of FIG. 2. The digital video stream 140 enters the pipeline 310 two sampled images at a time, starting with frames $t_1$ 315B and $t_2$ 315A. The sampled order is typically a fixed time interval δ such that, $$t_{i+1} = t_i + \delta,$$

where i is an integer, $t_1$ is the start frame. However, the sampling could be variable, i.e., δ could change over time.

This change could depend on the relevant motion. For example, the next sample could be determined based on the distance traveled by the object or the position of the object relative to some other object in the sequence. In a preferred embodiment, the user specifies the timing parameters 305 including the time interval δ which represents the fixed time period between frames to be used by the strobe process 500. At each iterative step of the strobe process, a segmentation mask 320 is updated and the strobe photo 240 is updated 325. The strobe photo 240 is the final result after all the incremental updates.

The segmentation mask records the locations in which relevant motions have occurred. These locations correspond to the locations in the frame where relevant motion was detected. The segmentation mask stores the locations in a well known fashion, similar to the use of an alpha channel in digital video hardware. However, the identification of a relevant motion is novel. A relevant motion is movement of an object into a new location: a location that the object has not occupied before during the time period sampled. Furthermore, we iteratively update this information based on our measurements to determine whether we have found the most likely instance of this occurrence. This will be elaborated on, in the description of FIG. 5.

Figure 4:
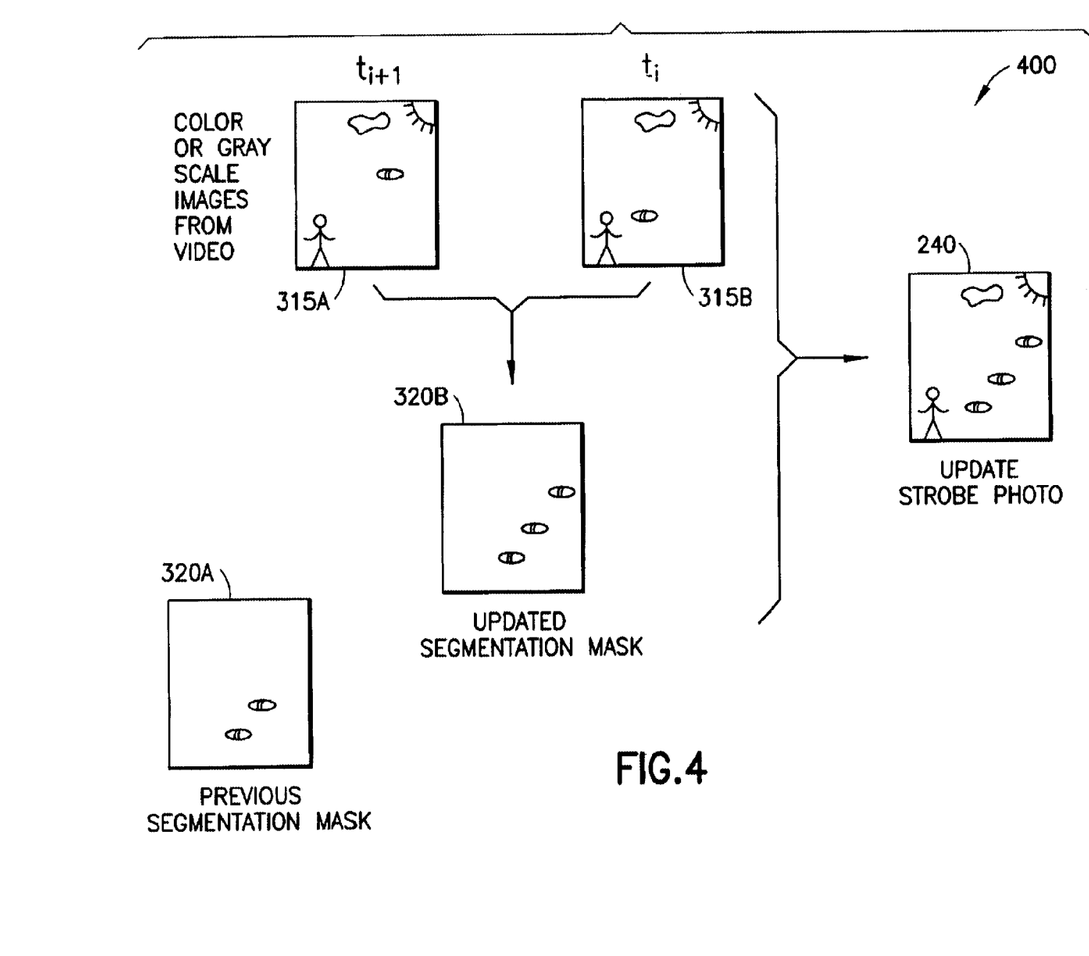
FIG. 4 shows two still frames from the sampled order, segmentation mask and updated strobe photo.

FIG. 4 shows two still frames from the video, the segmentation mask and the updated strobe photo at the time of the update. The still frames 315A and 315B represent the current frames of the video in the pipeline 310. These color or gray scale images are processed using attribute differencing 530 and the motion history record 535 to update the segmentation mask 320B from the previous segmentation mask 320A. Using the mask 320B and the most recent frame 315A, we update the strobe photo 325. The updated strobe photo becomes the digital strobe photograph 240 when the process is completed.

The attribute is typically a measure of the intensity or luminosity at each point. This can be computed from RGB color values using a normalized sum. This is well known procedure in the literature. Alternatively, prior information regarding the motion and/or the object, derived from the initialization stage, or dynamically inferred, can be used to determine a customized attribute.

For example, color information can be converted to the well known hue, saturation, intensity (HSI) space and the vector representing this information can be used as the attribute. Depending on conditions, both in the scene, such as lighting variation, or with respect to the camera, such as automatic gain circuits or user adjusted gamma corrections, the pixel data can be calibrated to reduce noise, correct for image defects and to optimize the information for segmentation. Examples of well known attributes that will improve segmentation in some instances include a spatial average, a median, or more generally a rank, and a maximum entropy. Similarly, it is possible to exploit knowledge of the object, such as from a user specifying a region of interest representing the initial position of the object, or based on dynamic information derived from the segmentation mask.

The attribute difference is typically computed as a pixel by pixel comparison of the corresponding attribute value in the two frames 315A and 315B that are currently in the pipeline 310. If the attribute is an intensity value, then the absolute magnitude of the difference between the intensities in the two corresponding pixels can be used as the attribute difference. If the attribute is a vector, then the magnitude and direction of the vector difference can be used. In cases where accuracy is paramount and computational constraints are less restrictive, more sophisticated attribute differences can be used to take advantage of local and temporal information. This includes neighborhood information around each pixel, i.e., a spatial window, or temporal information corresponding to this location but including both the adjacent sampled frames or the adjacent frames in the original sequence. This additional information can be used to compute an attribute difference based on a running average or the degree of correlation.

Figure 5:
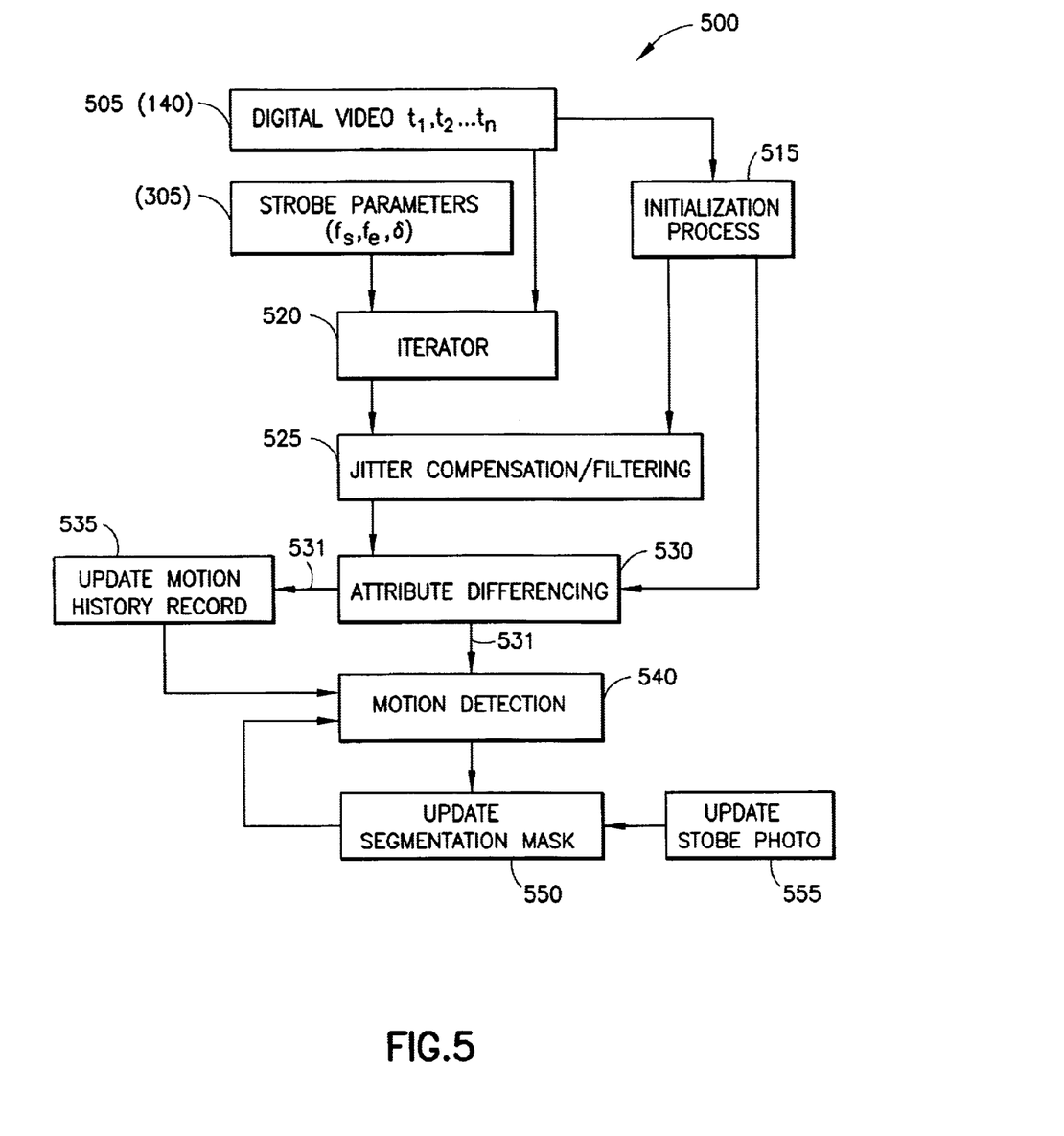
FIG. 5 is a flow chart of strobe process that operates on the data structure to produce a still frame.

FIG. 5 is a more detailed flow chart of the strobe process shown in FIG. 3. The strobe process 500 operates on the digital video stream 140 to produce the strobe photo 240. During the initialization process 515 a motion history record and segmentation mask are created and initialized. Additionally, the digital video stream 140 is used by the initialization process 515 to determine an appropriate attribute and its sensitivity for attribute differencing. The attribute is chosen based on the criteria discussed above, such as information regarding sources of noise, types of motion, input color format, specific object training samples etc. The sensitivity of the attribute difference is determined based on the type of attribute (intensity, color, color vector, etc.), the type of attribute difference (point-wise, neighborhood metrics), and the accuracy and types of relevant motion that the user is trying to discern. The attribute sensitivity can be a fixed threshold, an adaptive threshold, a user input threshold, or a color threshold based on the psychophysics of human perception.

Since we assume the background is stationary, or at most, slowly changing, it is acceptable to occasionally erroneously update background pixels with later background pixels. Therefore, attribute differencing plays a different role than in cases where motion detection needs to specifically isolate the moving object. The attribute sensitivity can be relatively low because we can tolerate false positives. In one preferred embodiment, the attribute and its sensitivity are simply the absolute luminance and a constant change detection threshold of 10 percent. In this case, the initialization is unnecessary. For an adaptive threshold, we can exploit the assumption that we are not interested in motion that is taking place globally or in greater than a user specified proportion of the image. This proportion could alternatively be based on a training sample of the moving object or even an early instance of the segmentation mask. In this case, the adaptive threshold is dynamically set so that the proportion of relevant motions found in any iteration does not exceed the specified amount. If the proportion of relevant motions to the image size is consistently too high, specifically if it is necessary to set the sensitivity below the signal to noise ratio, regardless of the sensitivity type, then spatial and temporal windows are used.

As will be detailed below, the attribute difference and its sensitivity play an important role in discerning relevant motions. The first time the attribute difference exceeds the sensitivity, a relevant motion is detected. Subsequently, the attribute difference is compared to the likelihood value computed from the motion history record to determine if a more statistically likely relevant motion has occurred. The attribute difference sensitivity and the confidence range selected to detect attribute difference outliers, determines whether too few but very accurate, or too many but inaccurate, relevant motions are detected.

The user enters the strobe parameters 305 which include the start frame $f_s$, the end frame $f_e$, and the time interval δ. The time interval δ represents the time period between sample frames. These parameters are used to iteratively sample the video stream using the iterator 520. The video frames are optionally filtered using well known techniques to compensate for jitter, dithering or other types of noise 525. For each pair of sampled frames based on the strobe timing parameters, we compute the attribute difference 530, update the motion history record 535, and detect relevant motion 540. The motion history record summarizes the incremental motion information that has occurred at each point. Depending on the criteria used to detect a relevant motion, we update the statistical parameters of the attribute difference. In the simplest case, we record the maximum attribute difference encountered in the sampled order so far. Alternatively, we can record an incrementally updated mean and variance of the attribute differences at each point in the motion history record or any other statistical parameters of the distribution of attribute differences occurring over time. In this way, we record information which can be used to determine if the current attribute difference is a statistically significant change from the distribution of attribute differences at this point. If the temporal mean and variance are recorded, we can identify a significant change if the current attribute difference exceeds a specified confidence range; similarly, if we record the maximum difference, we can test if the current difference exceeds the maximum by a specified amount. A relevant motion is the most likely instance, in time and space, of an object moving into a new location for the first time. This will be determined based on the segmentation mask and the motion history record as described below. It is recorded in the segmentation mask and can be updated as the video sequence is sampled.

If a relevant motion is detected at one or more locations, we update the segmentation mask 550 at the corresponding locations and in turn, the strobe photo 555. The segmentation mask 320 records locations in the frames in which changes have occurred. This is important because when an object moves from one location to another, two spatial phenomena will occur. The object will move out of one location (changing from object to background) and the object will move into another location (changing from background to object.) If we always update based on motion detection, we will update the new location with the object, and then update again, with the background. In our method, we update only after the first event, the object moving into a new location. However, this does have one problem. The initial position of the object is not recorded.

This problem can be partially addressed by reprocessing the initial motion after the video sequence is processed.

Following the data flow 300, we iteratively 520 sample two still frames from the ordered sequence incrementing by $\delta$ from $f_s$ to $f_e$. Starting with frames $t_1=f_s$ and $t_2=f_s+\delta$, we compute the attribute difference DIFF($t_1,t_2$) 530 for each pair of point-wise pixels (i,j) in the two frames using either a simple point-wise pixel difference in the simplest case, or using spatial and temporal windows in the case identified by the initialization stage. If this difference exceeds the change detection 540 threshold T and the segmentation mask SM 550 is not yet set, we update the segmentation mask 550 and the strobe photo SP 555 with the most recent pixel information. The mask is updated to indicate which locations have already detected motion, if ((SM(i,j)=NOT MARKED) AND (DIFF($t_1(i,j),t_{i+1}(i,j)$) >T)) then SM(i,j)=MARKED and the strobe photo is updated by taking the actual pixel value (color or grey scale) and using this pixel to replace the value at the same location in the current strobe photo, if (SM(i,j)=MARKED) then SP(i,j)=$T_2$(i,j).

In this way, object motion, as it first appears, i.e., moving into the background, is identified and updated 555 on the digital strobe photograph. Other pixels which vary because of camera noise, lighting fluctuations, wind, or shadows may also be updated, but since our ultimate strobe photo does not explicitly segment out the moving object, it doesn't matter. Our threshold can be relatively low because we can tolerate false positives. In the preferred embodiment, we use a luminosity threshold of 10%. On the other hand, since we use the segmentation mask 320 to identify the first occurrence of change, we need to correct for cases where change detection was too sensitive. We do this by monitoring at the pixel level, the motion statistics MS of the attribute differences up to this time 535 in the motion history record. If the likelihood of the current attribute difference 530 exceeds a predetermined confidence limit CL(MS) based on the motion statistics in the motion history record, we update the strobe photo 555 even if the segmentation mask is already set, if ((SM(,j)=MARKED) AND (MS(DIFF ($t_1(i,j),t_{i+1}(i,j)$)) >CL(MS))) then SM(i,j)=MARKED.

This is typically the case where the background was updated with more recent background (false positives) and then later updated with the moving object, which is identified by the relatively large attribute difference. This is repeated for each pair of frames, ($t_i,t_{i+1}$) until $t_{i+1}>f_e$.

Figure 6A:
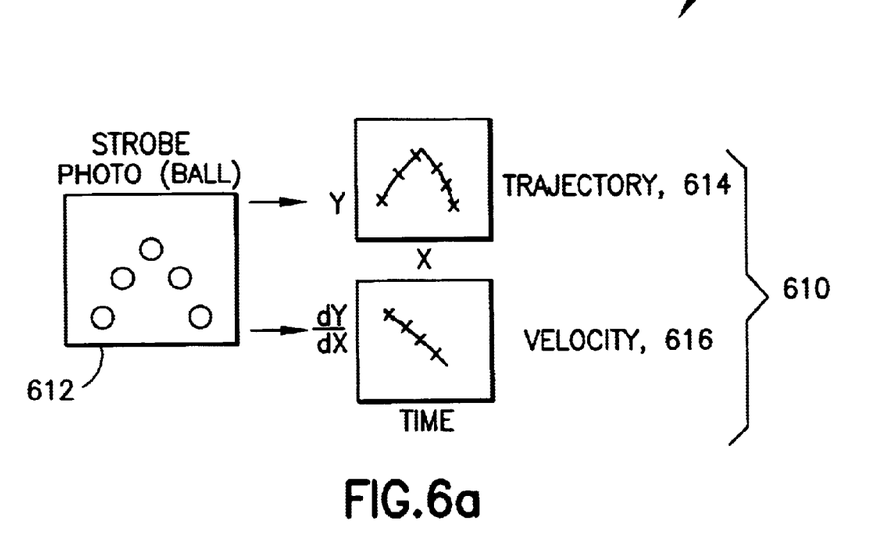
FIG. 6 is a block diagram of the invention used in an education and/or scientific application.
Figure 6B:
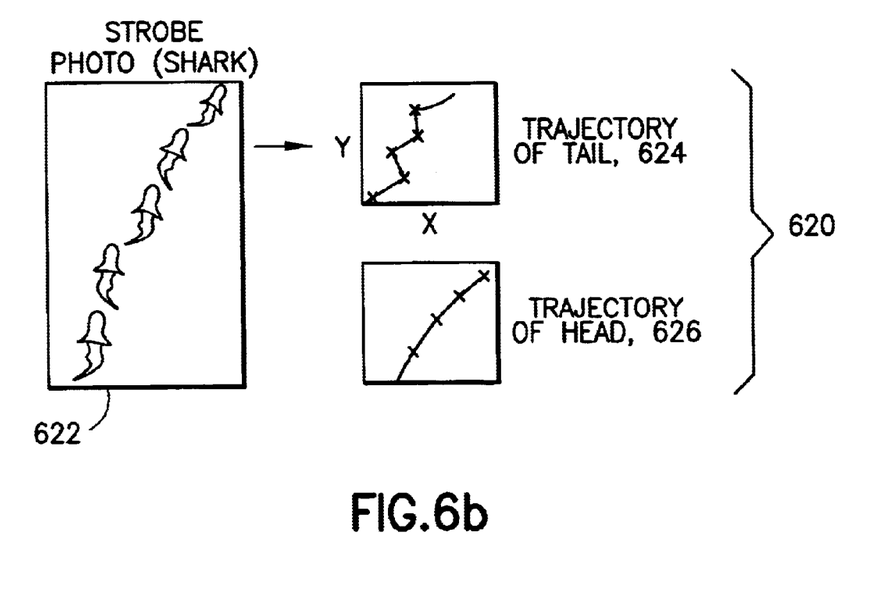

FIG. 6 is a block diagram of the invention used in an education and/or scientific application. In 6A, we have a video sequence in which a ball is tossed into the air. The strobe photo 612 depicts the motion of the ball over time. From this photo, the user could measure, for example, the trajectory 614 or the velocity 616 over time. In 6B, we have a video sequence in which a shark is swimming as seen from above. The strobe photo 622 shows the shark as it swims from the lower left to the upper right hand corner of the field of view. From this photo, the user could measure the trajectory of the tail 624 and the head 626 of the shark as it swims. This type of comparative study can be used to illustrate the properties of shark locomotion. Similarly, users can analyze many other types of motion, including large scale events viewed by telescopes, small scale events viewed by microscopes, very fast events viewed with high-speed cameras, or very slow events viewed using time-lapse photography. As long as the video sequence depicts the motion of a body across the image plane, with the camera fixed and the background at most slowly changing, the digital strobe process will create an accurate and visual record of the motion. This record can then be used to measure and analyze the event.

We have found the following important improvement to this technique for the case where relevant motions occur in the same image locations. In this case, we create the digital strobe photo in an analogous way to conventional photography in which the film is shifted or spooled between exposures. In this way, a single photograph contains multiple images of the same region, each image representing a different time slice. In the digital case, we can create a single image composed of time-shifted regions. The need to shift the motion depiction can be automated based on occurrence of relevant motion that is superimposed on previous motion. For the purposes of measurement, we can exploit the digital format of this mosaic image so that the user can measure positional data and the relative changes over the digital video stream in a single image. We can do this by maintaining internally the original absolute spatial information at each pixel for the final strobe photo. In this way, the user can accurately measure the absolute position of any point even though several redundant spatial positions are depicted.

We claim:

1. A video processing system having a computer with one or more central processing units (CPUs), one or more memories, and further comprising:
   a digital video stream, stored in one or more of the memories, the stream having a plurality of still frames in an ordered sequence; and
   a strobe process, executed by one or more of the CPUs, comprising the following steps:
   a. initializing a motion history record with one or more motion statistics, a segmentation mask, an attribute, and an attribute sensitivity;
   b. iteratively selecting two of the still frames in a sampled order;
   c. attribute differencing of the attribute the selected frames using a frame to frame comparison to determine an attribute difference at one or more frame locations in the frames and determining if the attribute difference from one frame to the other frame exceeds the attribute sensitivity;
   d. storing the attribute difference and the motion statistics of the attribute difference in the motion history record;
   e. if the attribute difference exceeds the attribute sensitivity when the segmentation mask has not yet been updated, determining a relevant motion;
   f. if the segmentation mask has been updated and the attribute difference exceeds one or more of the motion statistics within a statistical confidence level, determining a relevant motion;
   g. if a relevant motion is determined, updating the segmentation mask at one or more mask locations corresponding to the frame locations;
   h. if the segmentation mask is updated, updating a strobe photo with the relevant motion at one or more photo locations corresponding to the mask and frame locations so that a history of relevant motions is recorded on the strobe photo; and
   i. repeating steps b through h for each pair of frames selected.

2. A system, as in claim 1, where the attribute includes any one or more of the follow: an intensity, a luminosity, a color dimension, a color vector, a spatial average over a local window, and a median over the local window.

3. A system, as in claim 1, where the sensitivity includes any one or more of the following: an intensity threshold, a luminosity threshold, an adaptive threshold, a user input threshold, a threshold based on psychophysical measures of human color sensitivity, and a statistically significant change based on the measurements taken in the initialization step.

4. A system, as in claim 1, where the frame to frame comparison includes any one or more of the following: a pixel by pixel comparison, a window by window comparison, and a comparison of a combination of a temporal and spatial window.

5. A system, as in claim 1, where the attribute difference is an absolute magnitude.

6. A system, as in claim 1, where the sampled order is any one or more of the following: a consecutive sampling; a sampling every $n^{th}$ frame where n is any whole number; a reverse sampling, and a variable sampling.

7. A system, as in claim 1, where the motion history record includes a maximum attribute difference encountered in the sampled order so far, an incrementally updated mean, and a variance of the attribute differences.

8. A video processing system having a computer with one or more central processing units (CPUs), one or more memories, and further comprising:

a. means for initializing a motion history record with one or more motion statistics, a segmentation mask, an attribute, and an attribute sensitivity of a digital video stream having a plurality of still frames in an ordered sequence;
   b. means for iteratively selecting two of the still frames in a sampled order;
   c. means for attribute differencing of the attribute of the selected frames using a frame to frame comparison to determine an attribute difference at one or more frame locations in the frames and determining if the attribute difference from one frame to the other frame exceeds the attribute sensitivity;
   d. means for storing the attribute difference and the motion statistics of the attribute difference in the motion history record;
   e. means for determining a relevant motion if the attribute difference exceeds the attribute sensitivity when the segmentation mask has not yet been updated;
   f. means for determining a relevant motion, if the segmentation mask has been updated and the attribute difference exceeds one or more of the motion statistics within a statistical confidence level;
   g. means for updating the segmentation mask at one or more mask locations corresponding to the frame locations if a relevant motion is determined; and
   h. means for updating a strobe photo with the relevant motion at one or more photo locations corresponding to the mask and frame locations if the segmentation mask is updated, so that a history of relevant motions is recorded on the strobe photo.

9. A video processing system method comprising the steps of:
   a. initializing a motion history record with one or more motion statistics, a segmentation mask, an attribute, and an attribute sensitivity of a digital video stream having a plurality of still frames in an ordered sequence;
   b. iteratively selecting two of the still frames in a sampled order;
   c. attribute differencing of the attribute in the selected frames using a frame to frame comparison to determine an attribute difference at one or more frame locations in the frames and determining if the attribute difference from one frame to the other frame exceeds the attribute sensitivity;
   d. storing the attribute difference and the motion statistics of the attribute difference in the motion history record;
   e. determining a relevant motion if the attribute difference exceeds the attribute sensitivity when the segmentation mask has not yet been updated;
   f. determining a relevant motion if the segmentation mask has been updated and the attribute difference exceeds one or more of the motion statistics within a statistical confidence level;
   g. updating the segmentation mask at one or more mask locations corresponding to the frame locations if a relevant motion is determined; and
   h. updating a strobe photo with the relevant motion at one or more photo locations corresponding to the mask and frame locations if the segmentation mask is updated so that a history of relevant motions is recorded on the strobe photo.

10. A computer program product which performs the steps of:

a. initializing a motion history record with one or more motion statistics, a segmentation mask, an attribute, and an attribute sensitivity of a digital video stream having a plurality of still frames in an ordered sequence;

b. iteratively selecting two of the still frames in a sampled order;

c. attribute differencing of the attribute in the selected frames using a frame to frame comparison to determine an attribute difference at one or more frame locations in the frames and determining if the attribute difference from one frame to the other frame exceeds the attribute sensitivity;

d. storing the attribute difference and the motion statistics of the attribute difference in the motion history record;

e. determining a relevant motion if the attribute difference exceeds the attribute sensitivity when the segmentation mask has not yet been updated;

f. determining a relevant motion if the segmentation mask has been updated and the attribute difference exceeds one or more of the motion statistics within a statistical confidence level;

g. updating the segmentation mask at one or more mask locations corresponding to the frame locations if a relevant motion is determined; and h. updating a strobe photo with the relevant motion at one or more photo locations corresponding to the mask and frame locations if the segmentation mask is updated so that a history of relevant motions is recorded on the strobe photo.

* * * * *